(12) United States Patent
Arthurs (10) Patent No.: US 11,840,841 B2
(45) Date of Patent: Dec. 12, 2023

(54) SELF-SEALING CONSTRUCTION MATERIAL

(71) Applicant: Intertape Polymer Corp., Sarasota, FL (US)

(72) Inventor: Trevor Arthurs, Truro (CA)

(73) Assignee: IRIS WOVEN U.S., LLC, Sarasota, FL (US)

( * ) Notice: Subject to any disclaimer, the term of this patent is extended or adjusted under 35 U.S.C. 154(b) by 217 days.

(21) Appl. No.: 17/088,484

(22) Filed: Nov. 3, 2020

(65) Prior Publication Data

US 2021/0131106 A1 May 6, 2021

Related U.S. Application Data

(60) Provisional application No. 62/930,847, filed on Nov. 5, 2019.

(51) Int. Cl.
*E04D 5/10* (2006.01)
*B32B 5/02* (2006.01)

(52) U.S. Cl.
CPC .............. *E04D 5/10* (2013.01); *B32B 5/022* (2013.01); *B32B 2255/02* (2013.01);
(Continued)

(58) Field of Classification Search
CPC ............ B32B 2250/03; B32B 2250/05; B32B 2250/40; B32B 2250/44; B32B 2255/02; B32B 2255/26; B32B 2255/28; B32B 2260/021; B32B 2260/046; B32B 2262/023; B32B 2262/0238; B32B 2262/0253; B32B 2262/0261; B32B 2262/0269; B32B 2262/0276; B32B 2262/0292; B32B 2262/062; B32B 2262/14; B32B 2307/54; B32B 2307/546; B32B 2307/5825; B32B 2307/71; B32B 2307/7145; B32B 2307/718; B32B 2307/724; B32B 2307/726; B32B 2307/7265; B32B 2307/728; B32B 2307/732; B32B 2307/744;
(Continued)

(56) References Cited

U.S. PATENT DOCUMENTS 5,378,528 A * 1/1995 Makoui ................. A61F 13/551
604/374
9,125,758 B2 9/2015 Skreosen
(Continued)

FOREIGN PATENT DOCUMENTS

JP 06255035 A * 9/1994
JP 11115105 A * 4/1999
JP 2002316373 A * 10/2002

OTHER PUBLICATIONS

Translation of JP 11-115105, Hiroshima et al., Apr. 27, 1999. (Year: 1999).*
(Continued)

*Primary Examiner* — Hai Vo
(74) *Attorney, Agent, or Firm* — Christopher J. Knors; Moore & Van Allen PLLC (57) ABSTRACT

A construction material that is a laminate including a nonwoven comprising a super absorbent material and a method of self-sealing liquid transport through the construction material in proximity to punctures in the laminate.

13 Claims, 5 Drawing Sheets

(52) U.S. Cl.
CPC ..... *B32B 2255/28* (2013.01); *B32B 2307/726* (2013.01); *B32B 2307/744* (2013.01)

(58) Field of Classification Search
CPC ............ B32B 2419/06; B32B 2439/80; B32B 25/042; B32B 25/08; B32B 25/10; B32B 25/16; B32B 2571/00; B32B 2590/00; B32B 27/08; B32B 27/12; B32B 27/20; B32B 27/327; B32B 3/04; B32B 3/06; B32B 5/022; B32B 5/024; B32B 5/028; B32B 5/08; B32B 5/26; B32B 7/08; B32B 7/12; E04D 12/002; E04D 5/10
See application file for complete search history.

(56) References Cited

U.S. PATENT DOCUMENTS

| | | |
|---|---|---|
| 9,144,363 B2 | 9/2015 | Moskowitz et al. |
| 2010/0230062 A1* | 9/2010 | Attal ..................... C08L 9/00 427/389.9 |

OTHER PUBLICATIONS

Translation of JP 2002316373 A, Iwasa et al., Oct. 29, 2002, 10 pages. (Year: 2002).*
Translation of JP H06255035 A, Miyake et al., Sep. 13, 1994, 6 pages. (Year: 1994).*

* cited by examiner

SELF-SEALING CONSTRUCTION MATERIAL

CROSS-REFERENCE TO RELATED APPLICATIONS

This application claims the benefit of U.S. Provisional Application No. 62/930,847 filed on Nov. 5, 2019, the entirety of which is incorporated herein by reference.

TECHNICAL FIELD

The present disclosure provides a laminate construction material and a novel method for preventing or reducing liquid transport through the laminate in proximity to punctures present in the laminate. The laminate construction material of the present disclosure comprises a nonwoven with super absorbent material, and at least one coating layer disposed on the nonwoven.

BACKGROUND

In both residential and commercial roofing applications, a laminate construction material is used to provide a water protection barrier among other things. For roofing, a primary roof underlayment is used to protect the building interior whether the primary roof covering material is metal panels or shingles, concrete or clay tiles, wood shakes, or slate.

A variety of laminate construction material products are commonly used. For example, a commercial roofing underlayment is bituminous asphalt-based felt, commonly referred to as "felt" and is nailed or stapled to the roof or supporting structure. Felt comprises paper saturated with asphaltic resins to produce a continuous sheeting material that is processed into short rolls for application. In order to provide some level of nail sealable functionality, so as to prevent water transport, felts use very thick, heavy layers of bitumen to assist with sealing around the nails or staples. While such felts generally demonstrate good resistance to water ingress and good walkability in dry and wet roof conditions, they have disadvantages including high weight per unit surface area among other things. The weight of such felt laminate construction materials renders application more difficult, especially on sloped roofs. Likewise, there are nail sealable synthetic laminates that use a combination of a film or coated woven or nonwoven along with a very thick bitumen layer, such as SAFEGUARD 30™ and ICE AND WATER SHIELD™ examples which function similarly.

SUMMARY

In a first example, a laminate construction material is provided. The laminate construction material comprising a nonwoven layer, the nonwoven layer comprising a structure-facing major surface and an opposing major surface; a super absorbent material present between the structure-facing major surface and the opposing major surface; a first coating adjacent the structure-facing major surface; and a second coating adjacent the opposing major surface. In one aspect, the amount of super absorbent material is present in an amount that prevents or reduces liquid transport in proximity to fastening means through the nonwoven layer.

In another example, the nonwoven layer comprises polypropylene, polypropylene copolymer, polyester, nylon, polyethylene or polyethylene copolymer. In another example, alone or in combination with any of the previous examples, the super absorbent material is randomly or non-randomly distributed, dispersed, absorbed and/or immobilized in less than the entirety of the nonwoven layer.

In another example, alone or in combination with any of the previous examples, the super absorbent material is a polymer selected from starch graft copolymers, cross-linked carboxymethylcellulose derivatives, modified hydrophilic polyacrylates or polyacrylamides, hydrolyzed starch-acrylate graft co-polymer, saponified acrylic acid ester-vinyl co-polymer, neutralized cross-linked polyacrylic acid, cross-linked polyacrylate salts (potassium and/or sodium salts), and carboxylated cellulose.

In another example, alone or in combination with any of the previous examples, the laminate further comprising a woven scrim adjacent the structure-facing major surface. In another example, alone or in combination with any of the previous examples, the woven scrim is directly laminated to the nonwoven layer. In another example, alone or in combination with any of the previous examples, the woven scrim comprises high density polyethylene, polypropylene, or polypropylene copolymer. In another example, alone or in combination with any of the previous examples, the woven scrim comprises interwoven tape or fiber arranged in a warp and a weft pattern In another example, alone or in combination with any of the previous examples, the first coating and the second coating, independently, comprises polypropylene and copolymers or terpolymers of polypropylene EPDM, low density polyethylene (LDPE), linear low density polyethylene (LLDPE), plastomer or elastomer. In another example, alone or in combination with any of the previous examples, the first or second coating has anti-slip properties or anti-skid properties. In another example, alone or in combination with any of the previous examples, the second coating has an embossed surface with anti-slip properties or anti-skid properties.

In another example, a method for preventing or reducing liquid transport in a laminate in proximity to punctures through the laminate after install, is provided, the method comprising providing a laminate construction material to a structure-surface, the laminate comprising a nonwoven layer comprising a structure-facing major surface and an opposing major surface; a super absorbent material present between the structure-facing major surface and the opposing major surface; a first coating adjacent the structure-facing major surface; and a second coating adjacent the opposing major surface; wherein the amount of super absorbent material is present in an amount that prevents or reduces liquid transport in proximity to fastening means that have punctured at least partially through the nonwoven layer; wherein at least a portion of the laminate construction material is installed by penetrating through at least a portion of the nonwoven layer; and preventing or reducing liquid transport in a laminate in proximity to punctures through the laminate after install.

In one aspect, the super absorbent material provides a liquid transport barrier in proximity to the fastening means after receiving an amount of liquid in proximity to the fastening means.

In another example, alone or in combination with any of the previous examples, the method further comprises reducing vertical or horizontal stress of the nonwoven layer during absorption of liquid by the super absorbent material by randomly or non-randomly distributing, dispersing, absorbing and/or immobilizing, in less than the entirety of the nonwoven layer, the super absorbent material.

In another example, alone or in combination with any of the previous examples, the super absorbent material is a polymer selected from starch graft copolymers, cross-linked carboxymethylcellulose derivatives, modified hydrophilic polyacrylates or polyacrylamides, hydrolyzed starch-acrylate graft co-polymer, saponified acrylic acid ester-vinyl co-polymer, neutralized cross-linked polyacrylic acid, cross-linked polyacrylate salts (potassium and/or sodium salts), and carboxylated cellulose.

In another example, alone or in combination with any of the previous examples, the first coating or the second coating comprises EPDM, low density polyethylene (LDPE), linear low density polyethylene (LLDPE), polypropylene, polypropylene copolymers, plastomer, or elastomer. In another example, alone or in combination with any of the previous examples, the laminate further comprising a woven scrim adjacent the structure-facing major surface.

In another example, alone or in combination with any of the previous examples, the laminate further comprising a woven scrim adjacent the second coating. In another example, alone or in combination with any of the previous examples, the woven scrim comprises polyethylene, polypropylene, or polypropylene copolymer as interwoven tape or fiber.

DETAILED DESCRIPTION

The present disclosure relates to a laminate construction material comprising one or more nonwoven layers wherein at least a portion of at least one of the one or more nonwoven layers are coated with, imbibed, absorbed with, or coupled to, a super absorbent material. In one example the super absorbent material is a superabsorbent polymer (SAP). In one example, the laminate construction material is a laminate comprising at least one nonwoven substrate in combination with two or more additional layers of polymeric materials sandwiching the at least one nonwoven substrate, at least one of the at least one nonwoven substrate is contacted with an amount of super absorbent material.

In another example, the construction material is a laminate comprising a nonwoven substrate sandwiched between polymeric materials, the nonwoven substrate contacted with an amount of a super absorbent polymer (SAP). In another example, the construction material comprises a laminate of a nonwoven substrate in sandwiched between two or more additional layers of polymeric materials wherein the nonwoven substrate is coated, imbibed or absorbed with an amount of a super absorbent polymer (SAP). The amount of SAP relative to the amount of nonwoven substrate is such as to provide for self-sealing and/or resistance to liquid transport through the laminate construction material in the vicinity of punctures through the laminate construction material.

The present disclosure provides a reduced weight, self-sealing construction material providing improved resistance to water transport or migration after puncture by securing members such as nails, screws, staples, and other fasteners that penetrate at least partially thru the laminate construction material. The present disclosure is thus directed to a laminate construction material for use in roofing or as a house wrap that comprises a sheet-like material that is flexible, lightweight, resistant to water/water vapor permeable, resistant to tearing and prevents or eliminates water transport proximal to nails, screws, staples and other fasteners that have penetrated at least partially through the laminate construction material. The laminate provides water barrier properties, breathability, good tensile and tear strength, resistance to UV light, resistance to algae, fungi, mold, and resistance to rot and decay. The presently disclosed laminate provides environmental protection to the interior of a building and insulating materials underneath.

In one embodiment, the present disclosure comprises a construction material comprising a laminate of a combination of layers comprising at least one SAP coated nonwoven fiber layer in combination with one or more adjacent or directly adjacent layers selected from untreated or untreated nonwoven layers, extrusion coated layers, (reinforced) woven or nonwoven scrim, and combinations thereof. The construction material comprises a structure-facing major surface that is adjacent or directly adjacent to the structure in need of the construction material, and an opposing major surface separated by thickness that defines the thickness of the laminate. In one example, the SAP-containing layer of the laminate is proximal to the opposing major surface and distal from the structure-facing major surface.

In one example, the opposing major surface is embossed for slip resistance or otherwise configured to reduce or eliminate slippage of persons and/or equipment when the construction material is used or installed on non-horizontal surfaces.

In one example, the disclosed construction material provides for prevention or elimination of liquid water egress proximate or directly proximate to punctures through the construction material. In another example, the disclosed construction material provides for preventing or elimination of liquid transport from the opposing major surface to the structure-facing major surface proximate or directly proximate to a puncturing nail, screw, or staple driven at least partially through the construction material.

In one example, the laminate construction material of this disclosure is substantially waterproof. When used for building construction, laminate construction material of this disclosure preferably is of a relatively resilient structure that can be rolled, bent/folded, but generally does not crease or tear. In one example, the laminate construction material of the present disclosure comprises a woven scrim bonded with the nonwoven layer/super absorbent material sandwiched between at least two coatings, such that the nonwoven layer/super absorbent material is positioned more distally from a deck-facing surface (or structure-surface) than the woven scrim, as described below.

The term "nonwoven" means a web comprising a multitude of randomly distributed fibers. The fibers generally can be bonded to each other or can be unbonded. The fibers can be staple fibers or continuous fibers. The fibers can comprise a single material or a multitude of materials, either as a combination of different fibers or as a combination of similar fibers each comprised of different materials. As used herein, nonwoven(s) refers to any natural or polymer based fabric, including, but not limited to the following: polyethylene (PE), polypropylene (PP), polyester (PET), polyurethane, polyolefin, nylon, polyvinyl chloride (PVC), polystyrene (PS), Teflon, aramid, polyamide, a natural nonwoven cotton, etc. The nonwoven can be prepared using methods known to those skilled in the art, e.g., drylaid, airlaid, spunmelt, spunlaid, wetlaid.

The term "laminate" as used herein encompasses two or more layers of nonwoven or woven web, sheet, or layer laid down such that one of their respective major surfaces are adjacent to one of another's major surface.

The phrase "superabsorbent materials" as used herein refers to water-swellable, water-insoluble organic and/or inorganic materials/elements including superabsorbent polymers and superabsorbent polymer compositions capable, of absorbing at least about 1 times their weight, or at least about five (5) times their weight, or at least about ten (10) times their weight or more when contacted with an aqueous solution. In one example the aqueous solution is rainwater.

As used herein, the term "machine direction," or "MD," refers to the direction of a running, continuous film and/or web during the manufacture of a film laminate. As used herein, the term "cross direction," or "CD," refers to the direction that is essentially perpendicular to the machine direction. As used herein, the first surface is defined by a length along the MD and a width along the CD.

As used herein, the terms "including," "comprising," or "having" and variations thereof encompass the items listed thereafter and equivalents thereof, as well as additional items.

As used herein, the terms "first," "second," and the like are only used to describe elements as they relate to one another, and are in no way meant to recite specific orientations of an article or apparatus, to indicate or imply necessary or required orientations of an article or apparatus, or to specify how an article or apparatus described herein will be used, mounted, or positioned in use.

As used herein, when an element is referred to as being "coupled" or "adjacent" to another element, other elements or intervening elements may be present.

As used herein, when an element is referred to as being "directly coupled" or "directly adjacent" to another element, other elements or intervening elements are not present.

"Basis Weight" is a measure of the mass per unit area of a sheet or layer and was determined by ASTM D-751, which is hereby incorporated by reference, and is reported as an average value in grams per square meter ($g/m^2$).

When used as a roofing underlayment, the presently disclosed laminate construction material is suitable as a Type I and Type II roofing underlayment as specified in Chapter 15 of the IBC (International Building Code), and defined in Chapter 9 of the IRC (International Residential Code); and is also specified as Type 15 and Type 30 underlayment materials in Chapter 15 of the UBC (Uniform Building Code). The present laminate construction material will find utility as potential substitutes for conventional roofing underlayment, or as a useful laminate construction material in various roofing or house wrap construction projects.

Laminate Construction Material

Figure 1:
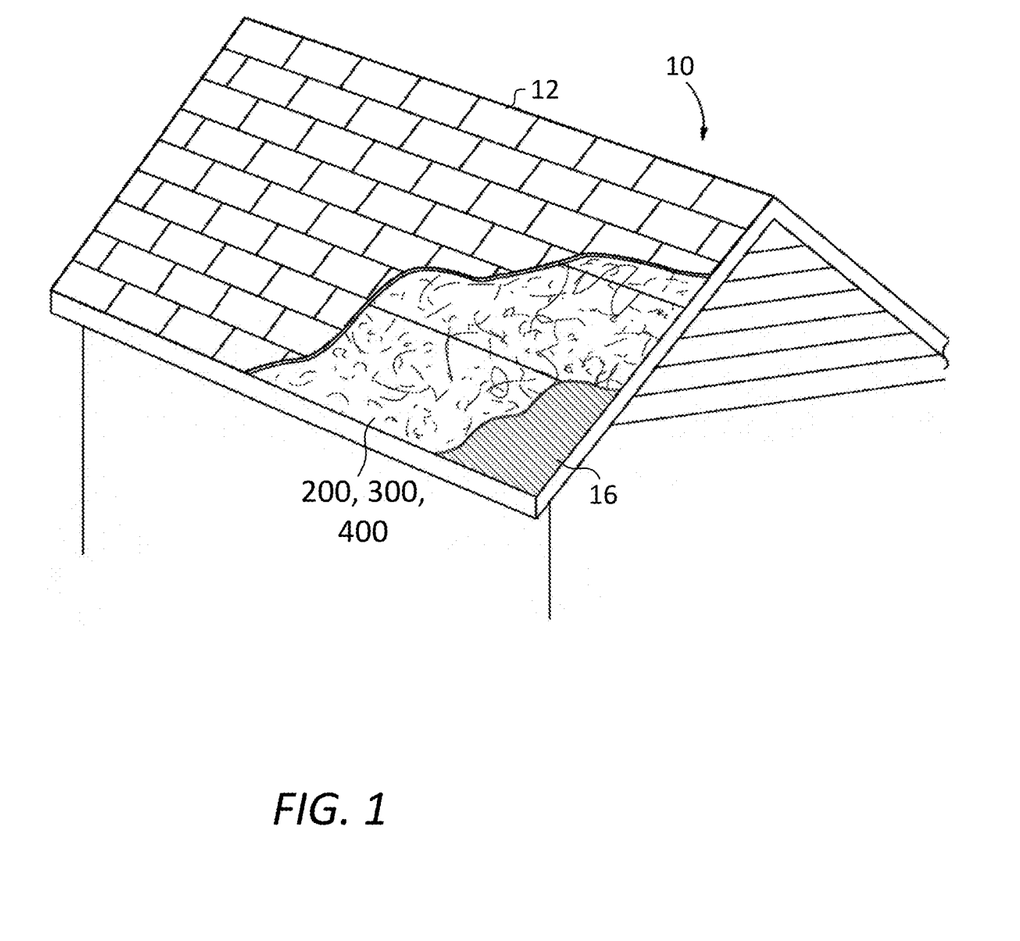
FIG. 1 is a schematic cross-sectional view of the composite layer material suitable as a laminate construction material or house wrap, in accordance with the present disclosure.
Figure 2:
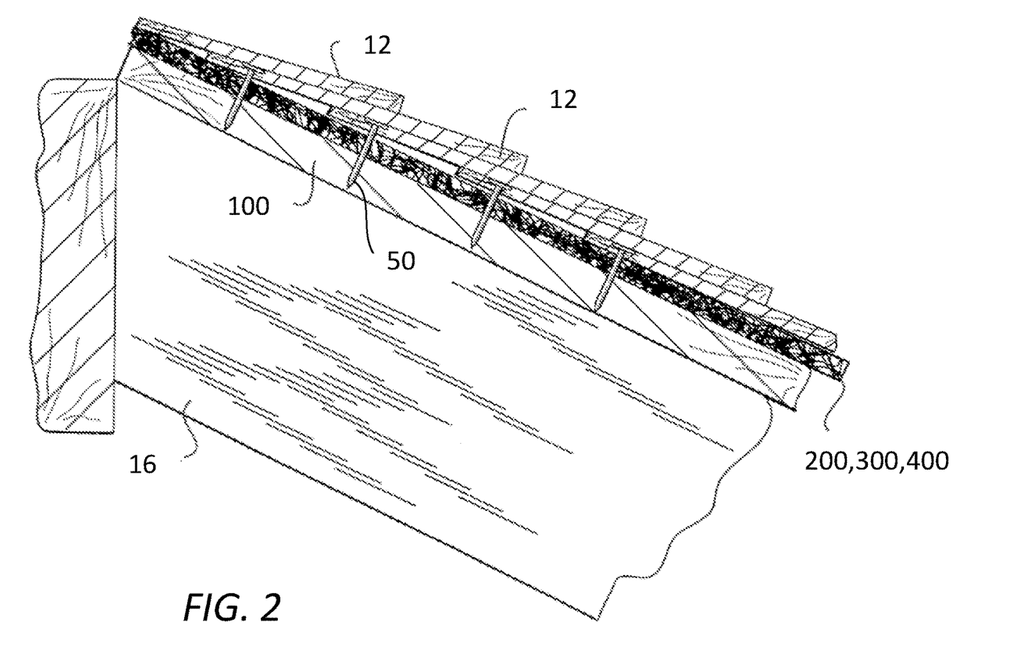
FIG. 2 is a cross-sectional view of an alternative example composite layer material, after installation, in accordance with the present disclosure.
Figure 3:
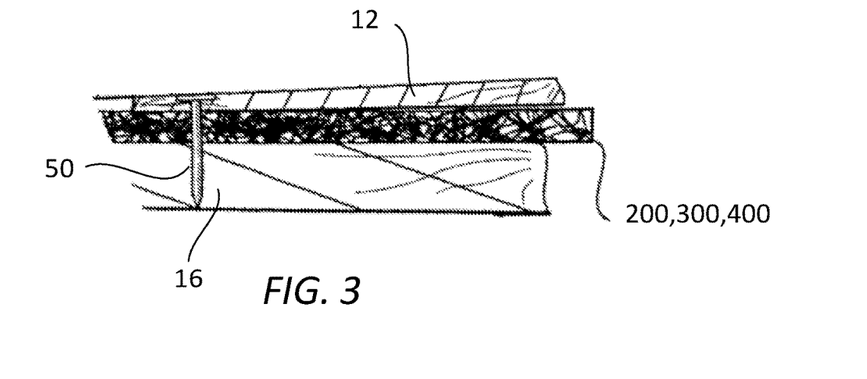
FIG. 3 is an enlarged cross-sectional view of the example composite layer material, in use, in accordance with the present disclosure.

FIG. 1 illustrates a building 10 having a laminate construction material 200, 300, 400 that is in accordance with the present disclosure and deployed, for example, as a roofing underlayment. A similar application of the presently disclosed laminate construction material as a house wrap is envisioned. A portion of the roofing is also shown in FIGS. 2, 3 to illustrate various components of a roofing system that includes an exterior structure-surface 16 or "roof deck," (or structure surface) a layer of laminate construction material 200, 300, 400 attached to the roof deck, and optionally a multiplicity of courses of roofing material 12 (e.g., shingles) attached and overlying the laminate construction material 200, 300, 400. The laminate construction material 200, 300, 400 is sandwiched structure-surface 16 and the multiplicity of courses of roofing material 12, which is fastened to structure surface 16 using fastening means, such as nails 50, screws, or staples. The components of the laminate construction material 200, 300, 400 thereof are described below.

Figure 4:
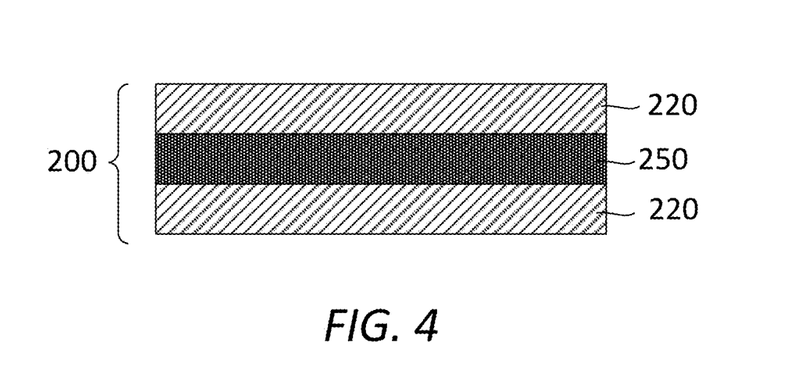
FIG. 4 is a cross-sectional views of an alternative example composite layer material of FIG. 3 in accordance with the present disclosure.

With reference to FIGS. 4, laminate construction material 200 is depicted. Thus, the laminate construction material 200 is shown having nonwoven-SAP layer 250 sandwiched between extrusion coatings 220. Coatings 220 may be the same or different.

Nonwoven-SAP layer 250 can be a single layer or a multilayer of nonwoven-SAP. Coatings 220 can be a single extrusion or multiple extrusion coating.

Figure 5:
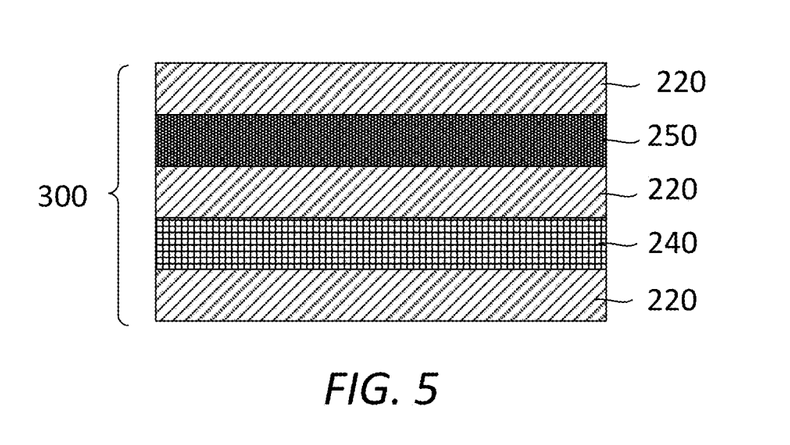
FIG. 5 is a cross-sectional view of the example composite layer material, accordance with the present disclosure
Figure 6:
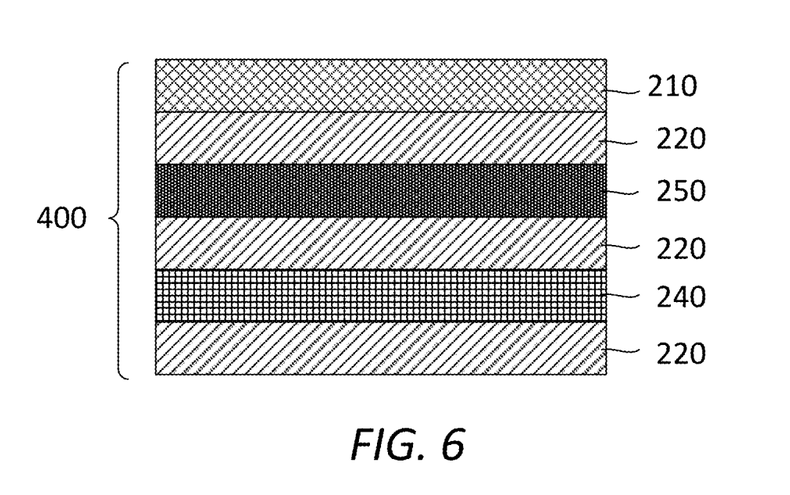
FIG. 6 is a cross-sectional view of another example composite layer material, in accordance with the present disclosure.

With reference to FIG. 5, laminate construction material 300 comprises a scrim that is contiguously sandwiched on both its upper and lower major surfaces (or structure-facing and non-structure surfaces, relative to, for example, a deck surface or side surface of a building or structure to be provided with the laminate construction material). Thus, laminate construction material 300 has woven scrim 240 sandwiched between the side (or major surface) of nonwoven-SAP layer 250 more proximal to structure-surface facing side and coating 220 configured for contact with structure-surface. Coatings 220 may be the same or different. With reference to FIG. 6, laminate construction material 400 is shown having a similar structure to that of material 300 and further comprising an additional nonwoven layer 210 for providing a walking surface, for example. Nonwoven layer 210 is devoid of any intentionally added SAP.

Super Absorbent Material

Superabsorbent materials as used herein encompasses a "superabsorbent polymer," "SAP", or "hydrogel(s)" that are water-soluble polymers which has been cross-linked to render it substantially water insoluble, but still capable of absorbing water. Super absorbent polymers are known in the art. A super absorbent polymer can be configured to have variable resistance to humidity, but nonetheless is otherwise configured to swell when put in intimate contact with water. Super absorbent polymers are available in a particulate, fibrous, granular or powder form. In one example SAP in particulate, fibrous, granular or powder form is sandwiched between at least one of a fluid pervious or fluid porous layer and/or a breathable and/or moisture vapor barrier layer. In one example, the SAP in particulate, fibrous, granular or powder form is sandwiched between at least one of a nonwoven fluid pervious or nonwoven fluid porous layer and/or a nonwoven breathable and/or moisture vapor barrier layer.

In one example, the super absorbent material is randomly or non-randomly distributed, dispersed, and/or immobilized in less than the entirety of one or more layers of the laminate construction material. In another example, the super absorbent material is a SAP randomly or non-randomly distributed, dispersed, and/or immobilized in or on less than the entirety of one or more layers of the laminate construction material.

In another example, SAPs include starch graft copolymers, cross-linked carboxymethylcellulose derivatives and modified hydrophilic polyacrylates or polyacrylamides. Non-limiting examples of such absorbent polymers are hydrolyzed starch-acrylate graft co-polymer, saponified acrylic acid ester-vinyl co-polymer, neutralized cross-linked polyacrylic acid, cross-linked polyacrylate salts (potassium and/or sodium salts), and carboxylated cellulose. SAPs, upon absorbing fluids, form hydrogels. SAPs are well known and are commercially available from several sources.

It is believed that any superabsorbent material capable of forming a hydrogel can be effective in the presently disclosed laminate construction material. In one example, the superabsorbent material is a natural or a synthetic hydrogel-forming material. In another example, the superabsorbent material is exclusively a synthetic hydrogel-forming material.

Examples of superabsorbent polymers include, for example, acrylate polymers, generally formed from acrylic acid, methacrylic acid, acrylate, methyl acrylate, ethyl acrylate, methyl methacrylate, ethyl methacrylate, a dialkylaminoalkyl acrylate, a dialkylaminoalkyl methacrylate, a trialkylammonioalkyl acrylate, and/or a trialkylammonioalkyl methacrylate, and include the polymers or copolymers of acrylic acid, methacrylic acid, methyl methacrylate, ethyl methacrylate, 2-dimethylaminoethyl methacrylate, and trimethylammonioethyl methacrylate chloride. Optionally, the woven scrim 240 can comprise one or more reinforcing fibers of glass, carbon, and the like.

The term "% by weight" or "% wt." or "gsm" when used herein and referring to components of the superabsorbent polymer composition or the layer in which it is contained, is to be interpreted as based on the weight of the dry superabsorbent polymer. In one example, more than 5 gsm of SAP is used. In another example, a range of about 5-100 gsm of SAP is used. In yet another example, about 10-50 gsm of SAP is used.

When the super absorbent polymer is contacted with liquid water, the super absorbent polymer increases in size. Depending on the relative size and thickness of the laminate layer comprising the SAP, the super absorbent polymers may reach maximum moisture retention in as quickly as about ten minutes or take days. After reaching maximum moisture retention, retained moisture slowly releases from the super absorbent polymer depending on the particular conditions present, such as for example, ambient temperature, sunlight, humidity, etc. The absorption and subsequent evaporation of retained moisture of the SAP can be repeated indefinitely, or can be configured to have a maximum lifetime, such as 10 years, 20 years, or more.

Nonwoven SAP Layer

In one example, the nonwoven-SAP layer 250 is formed of one or more nonwoven webs, sheets, or layers, that at are bonded to one another, at least one of the one or more nonwoven webs comprising SAP coated or imbibed thereon.

The nonwoven layer 250 may comprise polyolefin alone or in combination with polyester, rayon and polyamide fibers could also be 100% polyester. The nonwoven layer 250 may be spunbond, thermal point-bonded or ultrasonically-bonded (for nonwovens); chemically-bonded; or hydraulically-entangled. In one example, the nonwoven layer 250 consists of polypropylene, polyethylene or polyethylene copolymers.

In one example, the nonwoven layer 250 comprises thermoplastic olefins of ethylene copolymers. In one example of the present disclosure, the nonwoven layer has an average basis weight of about 15-25 $g/m^2$, about 16-19 $g/m^2$, or about 17-18 $g/m^2$.

Woven Scrim Examples

In one example, the laminate construction material comprises a scrim. In another example, the laminate construction material comprises a woven scrim 240, e.g., a woven fabric. The woven scrim 240 in one example is made from polyolefin materials such as polyethylene, polypropylene, copolymers and other combinations thereof. In another example, the woven scrim 240 is made from polypropylene or polypropylene-based polymers. In another example, the woven scrim 240 is made from polypropylene material and comprises interwoven tape or fiber. In one example, the woven scrim 240 consists of polypropylene or polypropylene copolymers. The woven scrim 240 in one example provides structural reinforcement to the laminate construction material 300, 400.

Tapes useful in the woven scrim 240 can be used, for example, at 5-10 tapes per inch (2.5 mm) of about 500-1000 denier polypropylene tape in the warp direction and 4-10 tapes per inch (2.5 mm) of about 500-1000 denier polypropylene tape in the weft direction. In one example, the woven scrim 240 is of tapes or fibers configured to form a mesh having substantial strength in multiple directions. In one example, the orientation of the thermoplastic tapes or fibers are selected to optimize their tensile strength or be of any other interwoven configuration. The tapes or fibers can be of any cross-sectional shape and size, depending upon the desired tensile characteristics of the woven scrim 240. In one example, the scrim 240 used in this disclosure is formed of polypropylene tapes or fibers interwoven to form a web that provides substantial strength to the roofing laminate construction material 200, 300, 400 in multiple directions.

In one example of the present disclosure, the woven scrim 240 has an average basis weight of about 35-50 $g/m^2$, about 40-45 $g/m^2$, or about 41-43 $g/m^2$. The nonwoven layer 250, when bonded to the adjacent layers, and in particular, when at least one of the adjacent layers is a woven scrim 240, provides high tenacity and relatively low elongation that provide the strength and other physical properties suitable for the laminate construction material.

Extrusion Coating Layer

In one example, the surface of the nonwoven layer 250 comprises at least one coating layer 220. In one example the at least one coating layer 220 is position most distally from the structure-surface 16, functions as an anti-skid surface. This anti-skid function provides secure footing while walking on the laminate construction material during installation and/or reconstruction of the roof thereby eliminating an extra, separate layer of anti-skid material to the surface of the nonwoven layer 250 most distal from the structure surface. Coating 220 can be a propylene-ethylene copolymers or other low molecular weight polyethylene copolymers, such as metallocene plastomer or elastomers, for example VERSIFY™ 4000 or 4200 (Dow, Midland, Mich.) or VISTAMAXX™ (Exxon, Houston, Tex.). In one example, the coating 220 provides a surface with a coefficient of friction with a minimum value of 0.50, 0.70, 0.73, or 0.80 as measured in accordance with ASTM F-1679 under dry conditions. Coating 220, e.g., of waterproof and/or tacky non-skid material is at least deposited most distal from the structure surface of laminate construction material 100, 200, 300, 400. In one example, coating 220 is directly deposited on one or both major surfaces of nonwoven layer 250.

The coating 220 can comprise one or more additives, for example, U.V. stabilizers, anti-block additives, colorants, and pigments, to the extent that such additives do not interfere with the any properties of the coatings or add weight to the laminate construction material 100. When used, additives can be added as part of a color masterbatch.

In one example of the present disclosure, the coating 220 (each layer or the sum total of all layers used) is provided at an average basis weight of about 20-40 g/m$^2$, about 22-35 g/m$^2$, or about 25-30 g/m$^2$.

Manufacturing Methods—Nonwoven-SAP Layer/Sub-Laminate

Manufacture methods of preparing nonwoven, superabsorbent polymer-impregnated structures are known. In one example, a continuous wet-laid process is used for forming a nonwoven containing dried residue of water insoluble, water-swellable, superabsorbent polymer. A wet-laid nonwoven fabric is a fabric comprising fibers which have been deposited from an aqueous suspension onto a moving foraminous support. An aqueous suspension of SAP is combined with the aqueous suspension of web-laid nonwoven fabric and jointly deposited onto the moving foraminous support. The amount of SAP contained in the webs prepared in a continuous wet-laid process is up to 60% of the total weight of the web.

In another example, production of nonwoven webs containing superabsorbent polymers (SAP) is produced by in-situ polymerization of partially neutralized acrylic monomers directly on a synthetic nonwoven substrate using methods known in the art. In an in-situ SAP process, a partially neutralized acrylic acid monomer solution is applied directly to a nonwoven substrate and then polymerized. The web may be fed to the process either as a pre-manufactured roll good or, preferably, made in-line from bulk stable fiber using a carding operation. The SAP monomer solution may be applied to the web using a variety of application techniques such as brush coating, pressurized liquid spray, air-assisted spray or airless spray. Polymerization may be by UV, E-beam, generation of free radicals and/or heat.

In another process, laminates are prepared by bonding superabsorbent polymer granules to nonwoven material. The degree of absorbency is determined by the amount and type of SAP used and the substrate. Performance characteristics of the SAP coated nonwoven can be enhanced by the use of alternative SAP and/or nonwoven or materials with a wide range of basis weights.

In one example, the superabsorbent polymer material is applied such that a generally non-continuous layer of superabsorbent polymer material is provided on or in the nonwoven. This can be achieved for example by applying superabsorbent polymer material in a discontinuous manner in the individual upper and lower laminate layer (such as in the form of "islands" of superabsorbent polymer material which are at least partly surrounded by areas with no superabsorbent polymer material) and combining the upper and lower laminate layer in a way that the superabsorbent polymer material is provided generally non-continuously between the upper and lower carrier substrates. In such embodiments, the "islands" of superabsorbent polymer materials in the respective layers only partially overlap each other to a certain extent upon combining the upper and lower layer together. Such an example laminate of the present disclosure is shown in FIG. 7.

Figure 7:
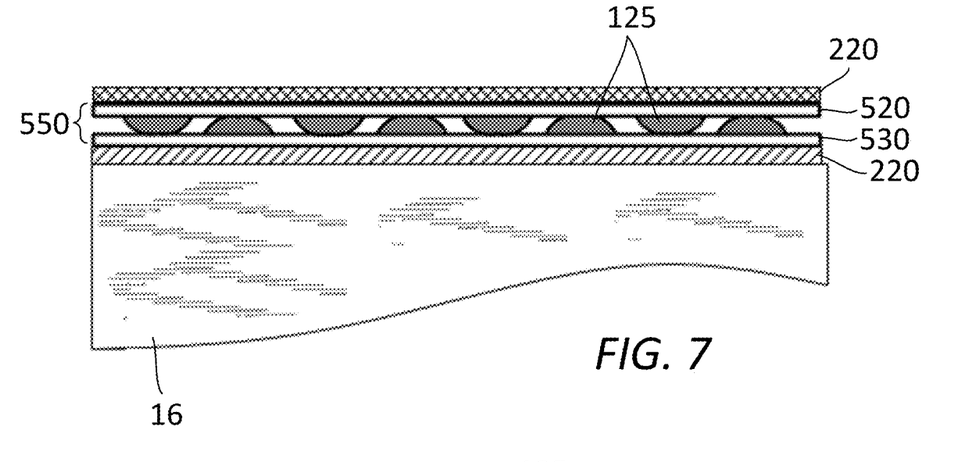
FIG. 7 is a cross-sectional view of the composite layer material, in use, in accordance with the present disclosure.

Thus, with reference to FIG. 7, in one example, a first carrier substrate 520 can be coated on one side with of SAP 125 that are adhesively fixed to the surface of the first carrier substrate 520, or dispersed or distributed in an adhesive that is coated on the surface of the carrier substrate. The resultant coated substrate can be joined with a similar coated second carrier substrate 530 (the same or different nonwoven) each of the respective major surfaces having the SAP are brought together to form a sub-laminate 550 having a structure of substrate-SAP-substrate. In one example, substrate 520 and substrate 530 are the same nonwoven material and have the same or different liquid transport properties due to the porosity of the nonwoven substrate. In another example substrate 520 and substrate 530 are chemically different nonwovens or have different liquid transport properties and/or different water vapor transport properties. SAP 125 can be configured so as to be randomly or non-randomly distributed on the major surface of each of the carrier substrate and when the carrier substrates are joint to sandwich the SAP 125 between the first and second carrier substrates 520, 530. The amount of SAP 125 as well as the distribution density of the SAP on the major surfaces as well as the distribution density of the sub-laminate 550 can be configured to provide sufficient expansion of the SAP in use so as to avoid excessive vertical and/or horizontal stresses within the laminate construction material while maintaining the ability to reduce or eliminate water transport through punctures caused by males, screws, or staples that have penetrated through the laminate construction material during installation and during use. Sub-laminate 550 can include (embossed) extrusion coated layer 220 on the surface most distal from the structure-surface 16. Sub-laminate 550 can further include extrusion coating layer 220 most proximal to the structure-surface 16. Additional layers, such as a scrim, a woman scrim, additional extrusion coated layers between the sub-laminate 550 and structure-surface 16 are envisioned.

The upper and lower laminate layers are placed together such that one surface of overlapping carrier substrates is proximal to the structure-surface 16 and the corresponding opposing surface of the carrier substrates facing outwardly. These aspects can be facilitated by joining the first and second laminate layer such, that the superabsorbent polymer material is not distributed generally continuously between the upper and lower laminate layer such that interstices are formed where little or no superabsorbent polymer material is present.

Figure 8:
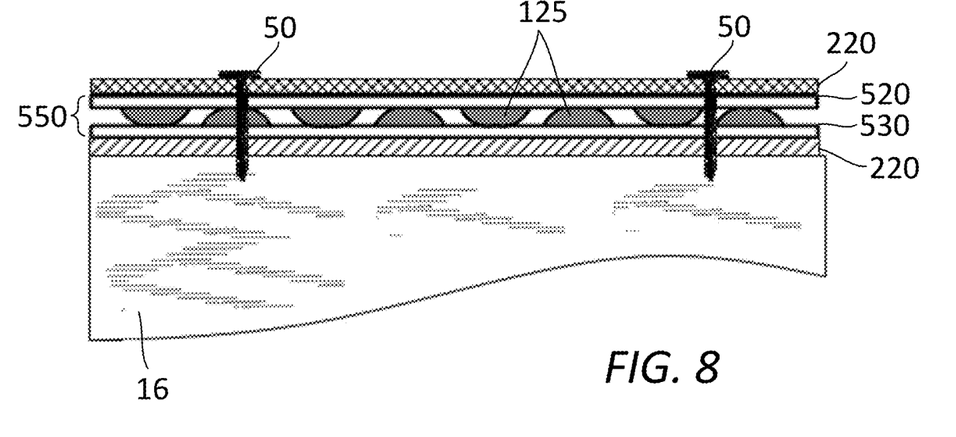
FIG. 8 is a cross-sectional view of another example composite layer material, in use, in accordance with the present disclosure.
Figure 9:
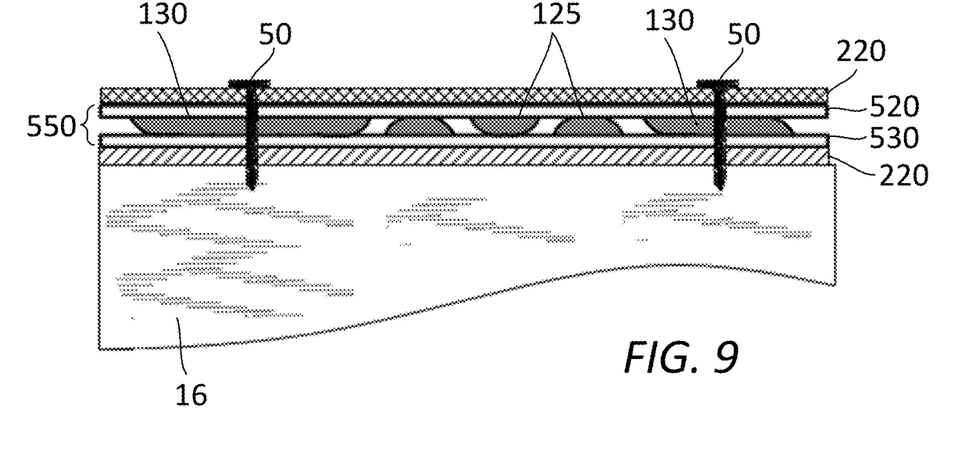
FIG. 9 is a cross-sectional view of another example composite layer material, in use, after exposure to liquid transport via a puncture, an in accordance with the present disclosure.

Sub-laminate 550 in use will be punctured by nails 50 during installation for example as depicted in FIG. 8. Upon egress of liquid water into openings caused by nails 50 driven through sub-laminate 550, SAP 125 absorb water and expand (and/or coalesce) in one or both vertical and horizontal directions relative to the machine direction of the laminate and provide for a self-sealing structure-function 130 proximal to nail 50 that prevents or eliminates subsequent liquid water transport through the laminate 550, as depicted in FIG. 9. In one example, SAP 125 is configured to rapidly absorb an amount of liquid and subsequently provide low liquid transport once the SAP has absorbed its equilibrium amount of liquid while at the same time providing self-sealing functionality by expanding in proximity to the nail 50.

Figure 10:
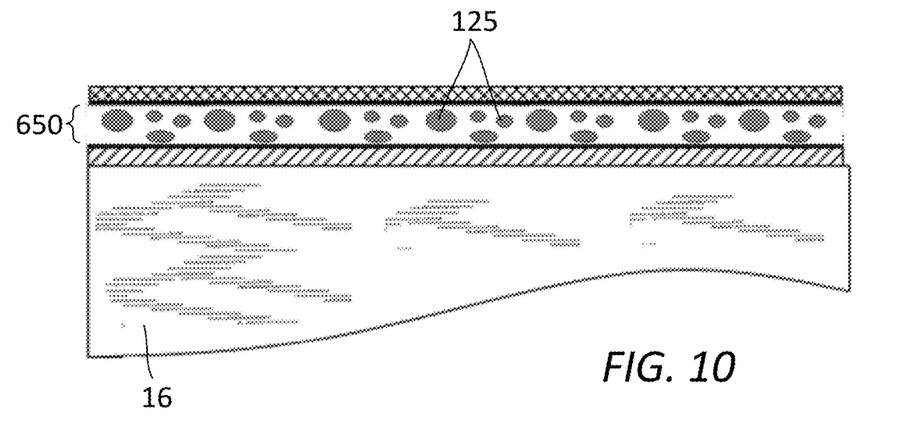
FIG. 10 is a cross-sectional view of another composite layer material, in use, in accordance with the present disclosure.
Figure 11:
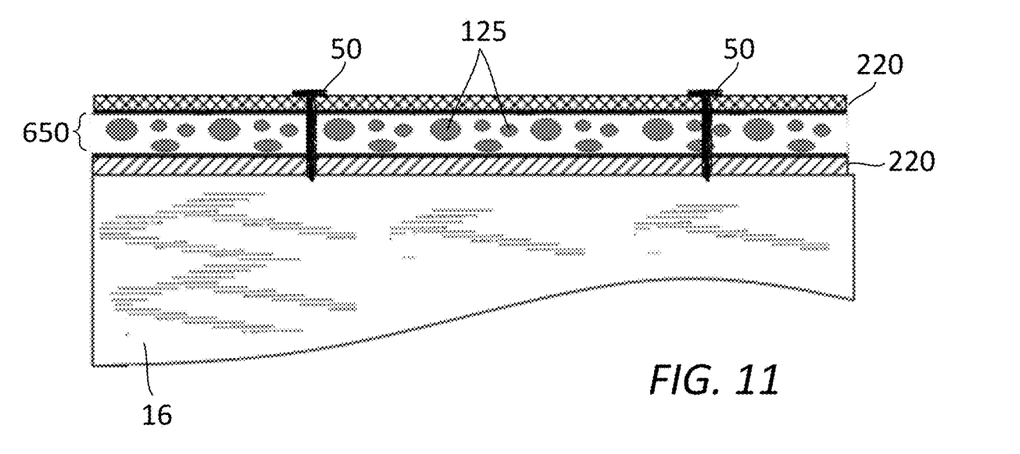
FIG. 11 is a cross-sectional view of the other example composite layer material, in use, in accordance with the present disclosure.
Figure 12:
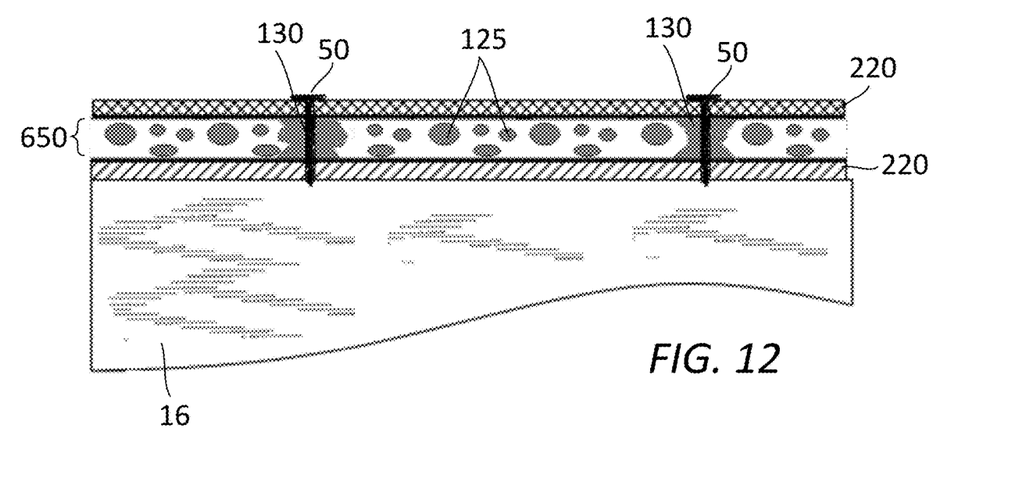
FIG. 12 is a cross-sectional views of the other example composite layer material, in use, after exposure to liquid transport via a puncture, an in accordance with the present disclosure.

In an alternate embodiment, depicted in FIG. 10-12, sub-laminate 650, comprises nonwoven comprising, within interstitial pores or spaces in the nonwoven, a sufficient amount and distribution of absorbed, imbibed, and/or covalently coupled imbibed SAP 125. The amount and distribution of the SAP in sub-laminate 650 can be configured to minimize vertical and horizontal stresses caused by the absorption of water and subsequent swelling of the SAP. Upon egress of liquid water into openings caused by nails 50 driven through sub-laminate 650, SAP 125 absorb water and expand (and/or coalesce) in one or both vertical and horizontal directions relative to the machine direction of the laminate and provides for a self-sealing structure-function 130 proximal to nail 50 that prevents or eliminates subsequent liquid water transport through the laminate 650, as depicted in FIG. 12.

In one example, the total thickness of the laminate construction material is configured to be about 5-20 mils, preferably about 5-10 mils. In one example, the total average weight, including the scrim 240, nonwoven-SAP layer 250 and coating 220 of the laminate construction material described herein Thus, the laminate construction material of this disclosure offers a considerable improved ease of installation and overall installation cost with the improvement of self-sealing and reduced liquid water transport through punctures.

In one example, the laminate construction material on the deck-facing side has a grab tensile strength of at least 13.6 kg-force (about 133 Newtons; 30 pounds), or at least 18.2 kg-force (about 178 Newtons; 40 pounds) in at least one of the machine direction (MD) or the cross-machine direction (CD). In another example, the laminate construction material 200, 300, 400 has a grab tensile strength of at least 27.2 kg-force (about 267 Newtons; 60 pounds) in at least one of the MD and the CD. In one example, the laminate construction material 200, 300, 400 on the deck-facing side has a grab tensile strength of at least 16.8 kg-force (about 165 Newtons; 37 pounds) in the CD.

In one example, the laminate construction material is configured to maintain a tensile strength of more than 357 kg-force/m (about 3500 N/meter; about 20 pound foot/inch width (lbf/in)) after simulated exposure to accelerated aging and sunlight. In another example, the laminate construction material 200, 300, 400 is configured to have an acceptable breaking strength, when tested pursuant to standards established by the American Society of Testing Materials (ASTM), i.e., ASTM D146. In another example, alone or in combination with the above grab and/or tensile strength, the laminate construction material 200, 300, 400 is configured to provide performance above the ASTM D226 criteria of about 5.5 kg-m (about 40 lb-ft) in machine direction and about 2.8 kg-m (about 20 lbf) for cross-machine direction.

The present laminate construction material 100, alone or in combination with any of the above tensile properties, is configured to provide acceptable weather resistance according to ASTM D4869 per AC 48.

An exemplary method of manufacture includes use of a roll calendaring process where nonwoven-SAP layer 250 receives coating layer 220 on both surfaces, optionally with one surface being embossed, so as to provide the laminate construction material 200. In another example, nonwoven-SAP layer 250 receives coating layer 220 on both surfaces, optionally with one surface being embossed, and is further joined with woven scrim 240, are mechanically bonded together to directly provide the laminate construction material.

In one example, the laminate construction material is formed in a manner such that the nonwoven-SAP 250 does not substantially impregnate the woven scrim 240 during bonding.

Extrusion Coating

Lamination of the nonwoven-SAP layer 250 with coating 220 can be carried out by extrusion coating of nonwoven-SAP layer 250. In one example, the coating 220 is applied by extrusion coating to the structure-facing side and opposing side of -SAP layer 250 to provide about 15 to about 40 g/m² of coating 220, as it is difficult to extrusion coat less than 15 g/m² of coating 220 without introducing pinholes holes into the coating 220. Coatings of greater than 40 g/m² add additional weight to the laminate construction material 200, 300, 400 without noticeable performance improvement. In an exemplary extrusion coating, coating 220 is subjected to elevated temperatures and pressures so as to soften and/or melt the material (e.g., pellets) and the softened or melted coating 220 is brought into engagement with the deck-facing side of woven scrim 240, e.g., using for example a nip roll.

In one example, an extrusion coating process is used, whereas the polymer that forms the coating 220 is melted at an elevated temperature to reduce its viscosity and coated onto the surface-facing side and opposing side of nonwoven-SAP layer 250 and passed through a nip, where the melt is pressed into engagement with the nonwoven-SAP layer 250 to a desired thickness.

The sub-laminate 550, 650 can be rolled and/or stored for later extrusion coating or used in a continuous process to dispose the coating 220 on the surface-facing side and opposing side of the sub-laminate.

In one example, the coating 220 functions as an anti-skid coating providing anti-skid properties to the roofing laminate construction material 200, 300, 400. Suitable thermoplastic olefin resins include, but are not limited to, EPDM, low density polyethylene (LDPE), linear low density polyethylene (LLDPE), plastomer or elastomer). Polyolefin coatings are selected to be compatible with the nonwoven-SAP 250 surface to which they are applied. In one example, the polyolefin coating is VISTAMAX™ (ExxonMobil, Houston, Tex.) or VERSIFY™ (Dow Chemical Co., Midland, Mich.).

The coating 220 of the present disclosure is suitable for extrusion coating onto scrim 240. Extrusion coating of a coating 220 onto scrim 240 may be accomplished by melting the coating precursor material in an extruder and extruding through a film die, for example, onto the scrim 240. The molten coating polymer and scrim 240 can be transported between a nip roll and a chill roll to cool the molten coating and to ensure adequate bonding thereto.

The composite laminate construction material of this disclosure has many additional industrial uses, including protective apparel, envelopes, medical packaging and graphics, such as billboards.

It will be understood by those skilled in the art that the present disclosure may be embodied in other specific forms without departing from the scope of the disclosure disclosed and that the examples and examples described herein are in all respects illustrative and not restrictive.

Any reference to claim elements in the singular, for example, using the articles "a," "an," or "the" is not to be construed as limiting the element to the singular. All numerical ranges are inclusive of their endpoints and non-integral values between the endpoints unless otherwise stated.

I claim:

1. A self-sealing laminate construction material comprising:
   a nonwoven layer comprising:
   a structure-facing major surface and an opposing major surface;
   a super absorbent material randomly distributed, dispersed, absorbed and/or immobilized in the nonwoven layer;
   a first polymeric coating adjacent the structure-facing major surface;
   a second polymeric coating adjacent the opposing major surface;
   a woven scrim on a surface of the first polymeric coating opposite the nonwoven layer; and
   a plurality of fasteners, each of which comprises a nail, a screw, or a staple;
   wherein the fasteners penetrate through the nonwoven layer, the first coating, and the second coating and the woven scrim;
   wherein the superabsorbent material is present in an amount of more than 5 gsm and prevents or reduces liquid transport through an entirety of the nonwoven layer in proximity to the fasteners present.

2. A laminate construction material of claim 1, wherein the nonwoven layer comprises polypropylene, polypropylene copolymer, polyester, nylon, polyethylene or polyethylene copolymer.

3. A laminate construction material of claim 1, wherein the super absorbent material is a polymer selected from the group consisting of starch graft copolymers, cross-linked carboxymethylcellulose derivatives, modified hydrophilic polyacrylates or polyacrylamides, hydrolyzed starch-acrylate graft co-polymer, saponified acrylic acid ester-vinyl co-polymer, neutralized cross-linked polyacrylic acid, cross-linked polyacrylate salts (potassium and/or sodium salts), and carboxylated cellulose.

4. A laminate construction material of claim 1, wherein the woven scrim is more proximal to the structure-facing major surface than the nonwoven layer opposing major surface.

5. A laminate construction material of claim 1, wherein the woven scrim comprises polyethylene, polypropylene, or polypropylene copolymer as interwoven tape or fiber.

6. A laminate construction material of claim 1, wherein the first polymeric coating and the second polymeric coating, independently, comprises polypropylene and copolymers or terpolymers of polypropylene EPDM, low density polyethylene (LDPE), linear low density polyethylene (LLDPE), plastomer, or elastomer.

7. A laminate construction material of claim 1, wherein the first polymeric coating or the second polymeric coating has anti-slip properties or anti-skid properties.

8. A laminate construction material of claim 1, wherein the second polymeric coating has an embossed surface with anti-slip properties or anti-skid properties.

9. A method for preventing or reducing liquid transport in a laminate in proximity to punctures through the laminate after install, the method comprising:
   providing a self-sealing laminate construction material to a structure-surface, the laminate comprising:
   a nonwoven layer comprising:
   a structure-facing major surface and an opposing major surface;
   a super absorbent material randomly distributed, dispersed, absorbed and/or immobilized in the nonwoven layer;
   a first polymeric coating adjacent the structure-facing major surface;
   a second polymeric coating adjacent the opposing major surface;
   a woven scrim on a surface of the first polymeric coating opposite the nonwoven layer; and
   wherein the amount of super absorbent material is present in an amount of more than 5 gsm;
   wherein at least a portion of the laminate construction material is installed by penetrating through at least a portion of the nonwoven layer, the first polymeric coating, the second polymeric coating and the woven scrim with a plurality of fasteners comprised of a nail, a screw, or a staple; and
   preventing or reducing liquid transport through the nonwoven layer, the first polymeric coating, the second polymeric coating and the woven scrim in proximity to the fasteners present.

10. A method of claim 9, wherein the super absorbent material provides a liquid transport barrier in proximity to the fastening means after receiving an amount of liquid in proximity to the fastening means.

11. A method of claim 9, wherein the super absorbent material is a polymer selected from the group consisting of starch graft copolymers, cross-linked carboxymethylcellulose derivatives, modified hydrophilic polyacrylates or polyacrylamides, hydrolyzed starch-acrylate graft co-polymer, saponified acrylic acid ester-vinyl co-polymer, neutralized cross-linked polyacrylic acid, cross-linked polyacrylate salts (potassium and/or sodium salts), and carboxylated cellulose.

12. A method of claim 9, wherein the first polymeric coating or the second polymeric coating comprises EPDM, low density polyethylene (LDPE), linear low density polyethylene (LLDPE), polypropylene, polypropylene copolymer, plastomer, or elastomer.

13. A method of claim 9, wherein the woven scrim comprises polyethylene, polypropylene, or polypropylene copolymer as interwoven tape or fiber.

* * * * *